US012489236B2

(12) United States Patent
Rouillard et al.

(10) Patent No.: US 12,489,236 B2
(45) Date of Patent: Dec. 2, 2025

(54) ELECTRICALLY CONDUCTIVE CONTACT ELEMENT FOR A CONNECTOR

(71) Applicants: Tyco Electronics France SAS, Pontoise (FR); TE Connectivity Solutions GmbH, Schaffhausen (CH)

(72) Inventors: Xavier Rouillard, Pontoise (FR); Joseph Daher, Pontoise (FR); Sundareshan M D, Pontoise (FR)

(73) Assignees: TE Connectivity Solutions GmbH, Schaffhausen (CH); Tyco Electronics France SAS, Pontoise (FR)

( * ) Notice: Subject to any disclaimer, the term of this patent is extended or adjusted under 35 U.S.C. 154(b) by 460 days.

(21) Appl. No.: 17/993,151

(22) Filed: Nov. 23, 2022

(65) Prior Publication Data

US 2023/0163504 A1 May 25, 2023

(30) Foreign Application Priority Data

Nov. 25, 2021 (EP) .................................... 21306644

(51) Int. Cl.
*H01R 13/03* (2006.01)
*H01R 13/15* (2006.01)
*H01R 43/16* (2006.01)

(52) U.S. Cl.
CPC ............. *H01R 13/03* (2013.01); *H01R 13/15* (2013.01); *H01R 43/16* (2013.01)

(58) Field of Classification Search
CPC ......... H01R 13/03; H01R 13/15; H01R 43/16
(Continued)

(56) References Cited

U.S. PATENT DOCUMENTS 7,700,883 B2 * 4/2010 Masago .................. C23C 26/02 174/126.2
7,871,710 B2 * 1/2011 Masago .................. B32B 15/01 428/929
(Continued)

FOREIGN PATENT DOCUMENTS

DE 102013203273 B4 * 2/2017 ........... B23K 1/0004
EP 1014494 A1 * 6/2000 ........... H01R 25/162
(Continued)

OTHER PUBLICATIONS

Japanese Office Action dated Nov. 21, 2023 with English translation, corresponding to Application No. 2022-185380, 12 pages.
(Continued)

*Primary Examiner* — Peter G Leigh
(74) *Attorney, Agent, or Firm* — Barley Snyder

(57) ABSTRACT

An electrically conductive contact element for an electrical connector comprises a body and a layer of electrically conductive material provided on the body. The body includes a first face having at least one depression forming a reservoir defined therein. The layer of electrically conductive material is provided on the first face of the body and fills the at least one depression. The layer defines a contact surface adapted to be brought into contact with a surface of a connecting part of a mating electrical connector mated with the electrical connector. The contact surface is formed by a surface of the layer of electrically conductive material facing away from the body.

20 Claims, 4 Drawing Sheets

(58) Field of Classification Search
USPC .......................................................... 439/886
See application file for complete search history.

(56) References Cited

U.S. PATENT DOCUMENTS

| | | | | |
|---|---|---|---|---|
| 8,076,582 | B2 * | 12/2011 | Masago | C25D 5/34 174/126.2 |
| 8,188,392 | B2 * | 5/2012 | Isberg | H01H 1/06 200/279 |
| 8,445,057 | B2 * | 5/2013 | Suzuki | C25D 5/50 427/376.8 |
| 8,835,771 | B2 * | 9/2014 | Masago | H01R 12/55 174/250 |
| 8,940,405 | B2 * | 1/2015 | Masago | H01R 13/03 428/668 |
| 9,373,925 | B2 * | 6/2016 | Masago | H01R 43/16 |
| 9,531,098 | B2 * | 12/2016 | Takahashi | H01R 13/02 |
| 9,543,679 | B2 * | 1/2017 | Schmidt | H01H 1/10 |
| 9,634,412 | B2 * | 4/2017 | Uzoh | H01R 13/03 |
| 9,871,311 | B2 * | 1/2018 | Fukui | H01R 13/04 |
| 2008/0257581 | A1 * | 10/2008 | Masago | C25D 5/34 174/126.2 |
| 2009/0053553 | A1 * | 2/2009 | Masago | B32B 15/01 428/647 |
| 2010/0163277 | A1 * | 7/2010 | Masago | H01R 13/03 174/126.2 |
| 2012/0138330 | A1 * | 6/2012 | Masago | C25D 5/627 174/68.1 |
| 2013/0014979 | A1 | 1/2013 | Uzoh et al. | |
| 2014/0357138 | A1 * | 12/2014 | Nakamura | H01R 13/04 439/884 |
| 2015/0236439 | A1 * | 8/2015 | Okubo | C25D 5/10 439/886 |
| 2016/0322729 | A1 * | 11/2016 | Onuma | H01R 13/113 |

FOREIGN PATENT DOCUMENTS

| | | | | | |
|---|---|---|---|---|---|
| EP | 3497752 | A1 | | 6/2019 | |
| JP | 2007280945 | A | * | 10/2007 | B32B 15/018 |
| JP | 2008269999 | A | * | 11/2008 | C23C 2/02 |
| JP | 5128153 | B2 | * | 1/2013 | B32B 15/018 |
| JP | 2015109198 | A | | 6/2015 | |
| JP | 2015220145 | A | | 12/2015 | |
| JP | 5975903 | B2 | * | 8/2016 | C23C 2/02 |
| JP | 6677508 | B2 | * | 4/2020 | |
| JP | 2021125436 | A | * | 8/2021 | H01R 13/04 |
| WO | WO-2017150345 | A1 | * | 9/2017 | |
| WO | 2018029179 | A1 | | 2/2018 | |
| WO | 2020049988 | A1 | | 12/2020 | |

OTHER PUBLICATIONS

Korean Office Action dated Feb. 3, 2025 with English translation, corresponding to Application No. 10-2022-0158285, 27 pages.
Japanese Decision of Refusal dated May 14, 2024 with English translation, corresponding to Application No. 2022-185380, 5 pages.
Extended European Search Report, Application No. 21306644.2-1201, Dated: May 13, 2022, 10 pages.
European Patent Office Examination Report dated Mar. 27, 2025, corresponding to Application No. 21 306 644.2-1201, 9 pages.

* cited by examiner

ELECTRICALLY CONDUCTIVE CONTACT ELEMENT FOR A CONNECTOR

CROSS-REFERENCE TO RELATED APPLICATIONS

This application claims the benefit of European Patent Application No. 21306644.2 filed on Nov. 25, 2021, the whole disclosure of which is incorporated herein by reference.

FIELD OF THE INVENTION

The present disclosure relates to a an electrically conductive contact element for a connector.

BACKGROUND

Electrical connectors are generally used for signal or power transmission and to link electrical and electronic systems. Electrical connectors are provided with electrically conductive contact elements, which come into contact with a contact element of a mating electrical connector when the electrical connector is plugged to the mating electrical connector. The contact elements of the connector element are commonly formed as contact pins and those of the mating connector are commonly formed as contact springs. When the connector and mating connector are coupled, the contact springs exert elastic spring forces on the contact pins and thereby provide an electrical connection between the contact elements. The quality of the electrical connection may be affected by mechanical and/or chemical degradations occurring at the contact surfaces of the contact elements. The respective contact surface of the electrically conductive contact elements may be coated with a layer of tin, nickel or alloys thereof.

As in motor vehicles, electrical connectors may be exposed to broad temperature variations, vibrations and corrosive environment, it can cause damages to the layer coating the contact surface. Fretting corrosion is known as a degradation resulting from the combination of a mechanical motion and a chemical reaction. The combination of the relative motion of mated contact surfaces, causing fretting wear, with corrosion (like oxidation) may lead to fretting corrosion. Fretting corrosion leads to the formation of insulating oxide layers in contact areas and can cause an increase of the electrical contact resistance. Moreover, wear damages (e.g., abrasion) at the contact surfaces of the contact elements may also lead to an increase of the electrical constriction resistance. As the performance of the electrical connector is related to the reliability of the electrical contacts, there is a need for preventing wear damage at the contact surfaces so as to avoid malfunction due to the increase in electrical resistance.

Along with improving wear and corrosion resistance, low plugging and pulling forces are required in order to facilitate the mounting and maintenance of electrical connectors. In order to reduce the plugging force, the surface wear or fretting corrosion, the contact surfaces of the connectors from the prior art are oiled or greased. However, greased or oiled contact surfaces lose the applied grease or oil when in operation. For addressing this drawback related to the use of grease or oil in the contact surfaces, it is known to provide an electrically conductive contact element for an electrical connector comprising a contact surface having a plurality of caverns arranged under the contact surface in a microstructure and having a lubricant filled and enclosed in the plurality of caverns. The spatial dimensions in the caverns are in the range of 0.1-50 micrometers. The arrangement of the caverns is such that an outlet of the cavern is tight enough so that the lubricant filled into the caverns cannot be accessed without establishing an opening from the contact surfaces into the cavern. Manufacturing the microstructure requires the use of a laser, an electron beam or surface treatment like masking and etching.

The object of the present invention is to provide an improved and cost-effective contact element for a connector which can better withstand wear so as to reduce the contact resistance while reducing the mating force to ease the assembly and the maintenance of the connector, in particular without the need of using lubricant.

SUMMARY

According to an embodiment of the present disclosure, an electrically conductive contact element for an electrical connector comprises a body and a layer of electrically conductive material provided on the body. The body includes a first face having at least one depression forming a reservoir defined therein. The layer of electrically conductive material is provided on the first face of the body and fills the at least one depression. The layer defines a contact surface adapted to be brought into contact with a surface of a connecting part of a mating electrical connector mated with the electrical connector. The contact surface is formed by a surface of the layer of electrically conductive material facing away from the body.

BRIEF DESCRIPTION OF THE DRAWINGS

The invention will now be described by way of example with reference to the accompanying Figures, of which.

DETAILED DESCRIPTION OF THE EMBODIMENTS

Figure 1:
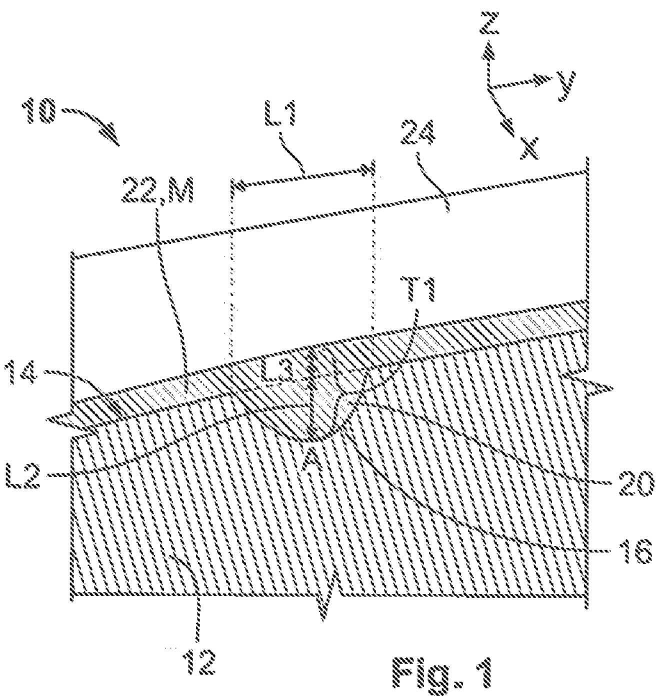
FIG. 1 is a partial cross-sectional view of an electrically conductive contact element according to a first embodiment of the present invention at an initial stage.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
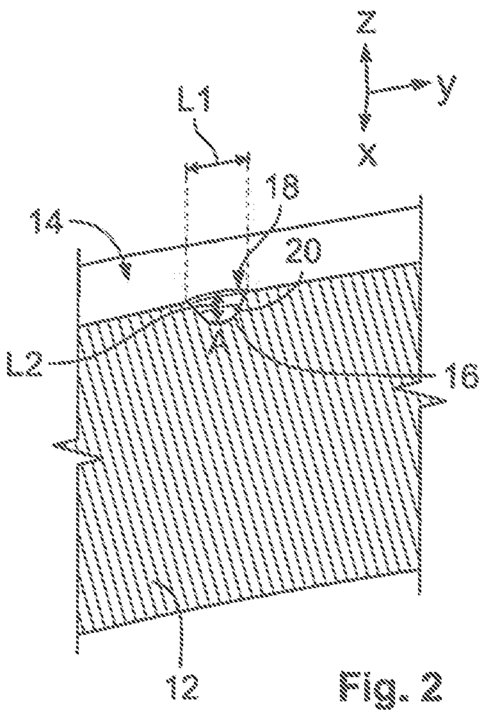
FIG. 2 illustrates a body of the electrically conductive contact element shown in FIG. 1.

FIG. 1 and FIG. 2 illustrate a partial cross-sectional view of a body of an electrically conductive contact element 10 according to a first embodiment of the present invention. In FIG. 1, a contact surface is represented, while in FIG. 2 the contact surface is omitted in order to better highlight the structure of the body of the electrically conductive contact element 10. The electrically conductive contact element 10 for an electrical connector comprises a body 12, in particular a metallic body. The body 12 is delimited by a plurality of faces. According to the present disclosure, at least one face 14 of the body 12 is provided with a depression 16. The face 14 extends in a plane (XY) in the example of FIGS. 1 and 2. The depression 16 extends from an opening 18 in the face 14 partially into the body 12 along a direction parallel to the axis Z. In the first embodiment, the depression 16 has a substantially half-spherical shape. The diameter L1 of the corresponding circular opening 18 can be greater than 0.05 mm, in particular can be comprised between 0.05 mm and 0.06 mm. The maximum depth L2 of the depression 16 is greater than 0.01 mm. Namely, the maximum depth L2 of the depression 16 can be greater than 0.03 mm, in particular greater than 0.04 mm, more in particular greater than 0.05 mm. It is noted that wording "greater" is to be read as "equal or greater", and not "strictly greater".

In one embodiment, the depression 16 can have a groove shape, in particular a rounded groove shape. However, the opening 18 of the depression 16 can have a square shape, a rectangular shape, an oval shape, triangular shape, etc. without departing from the scope of the present disclosure. The depression 16 forms a reservoir 20. FIG. 2 illustrates an empty reservoir 20 in order to better highlight the structure of the depression 16. As mentioned above and emphasized in FIG. 2, the depression 16 has one open-end 18.

As shown in FIG. 1, a layer 22 of an electrically conductive material M of thickness L3 is provided on the face 14 of the body 12. The electrically conductive material M is a plating material that can be made of tin, nickel, silver, gold, a tin-nickel alloy, an alloy of tin or nickel-silver alloy. In the first embodiment, the layer 22 of the electrically conductive material M is directly provided on the face 14. A surface 24 of the layer 22 facing away from the body 12 of the electrically conductive contact element 10 forms a contact surface 24. The contact surface 24 extends substantially in the plane (XY). The contact surface 24 is configured to be brought into contact with a surface of a connecting part of a mating electrical connector.

As shown at the initial stage represented in FIG. 1, in the first embodiment, a thickness T1 of electrically conductive material M is provided above a deepest point A of the reservoir 20, wherein T1=L2+L3. The initial stage relates to a stage wherein the electrically conductive contact element 10 has not yet being brought in contact with an electrically conductive contact element of a mating connector. Hence, at the initial stage mechanical wear, corrosion, abrasion or any damages that may result from the mating surfaces have not yet occurred. That is why in the initial stage, as shown in FIG. 1, the contact surface 24 is substantially flat in the plane (XY).

In the following, elements with the same reference numeral already described and illustrated with respect to FIGS. 1 and 2 will not necessarily be described in detail again, but reference is made to the previous description of the same reference numeral.

Figure 3:
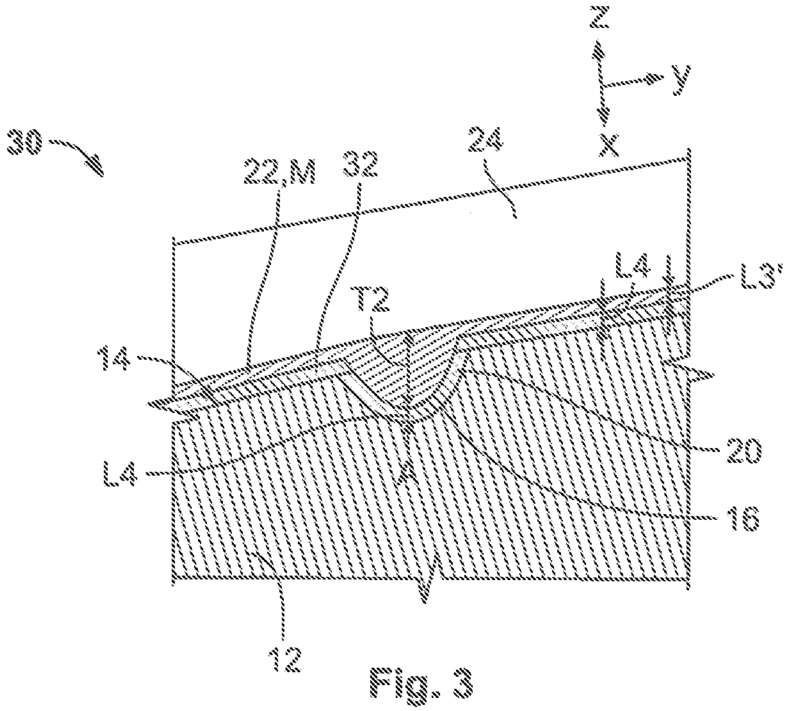
FIG. 3 illustrates a partial cross-sectional view of an electrically conductive contact element according to a second embodiment of the present invention at an initial stage.

FIG. 3 illustrates a partial cross-sectional view of a body of an electrically conductive contact element 30 according to a second embodiment of the present invention. In comparison to the first embodiment, in the second embodiment an adhesion layer 32 is directly provided on the face 14 of the body 12 and sandwiched between the face 14 of the body 12 and the layer 22 of the electrically conductive material M. The adhesion layer 32 is provided with a substantially uniform thickness L4 on the face 14, including on the face 14 in the depression 16, as shown in FIG. 3. In the second embodiment, the layer 22 has a thickness L3', wherein L3'<L3. As shown in the initial stage represented in FIG. 3, in the second embodiment, a thickness T2 of electrically conductive material M is provided above the deepest point A of the reservoir 20, wherein T2=L3'+(L2−L4). In a variant (not represented), further layers may be sandwiched between the face 14 of the body 12 and the layer 22 of the electrically conductive material M.

Figure 4A:
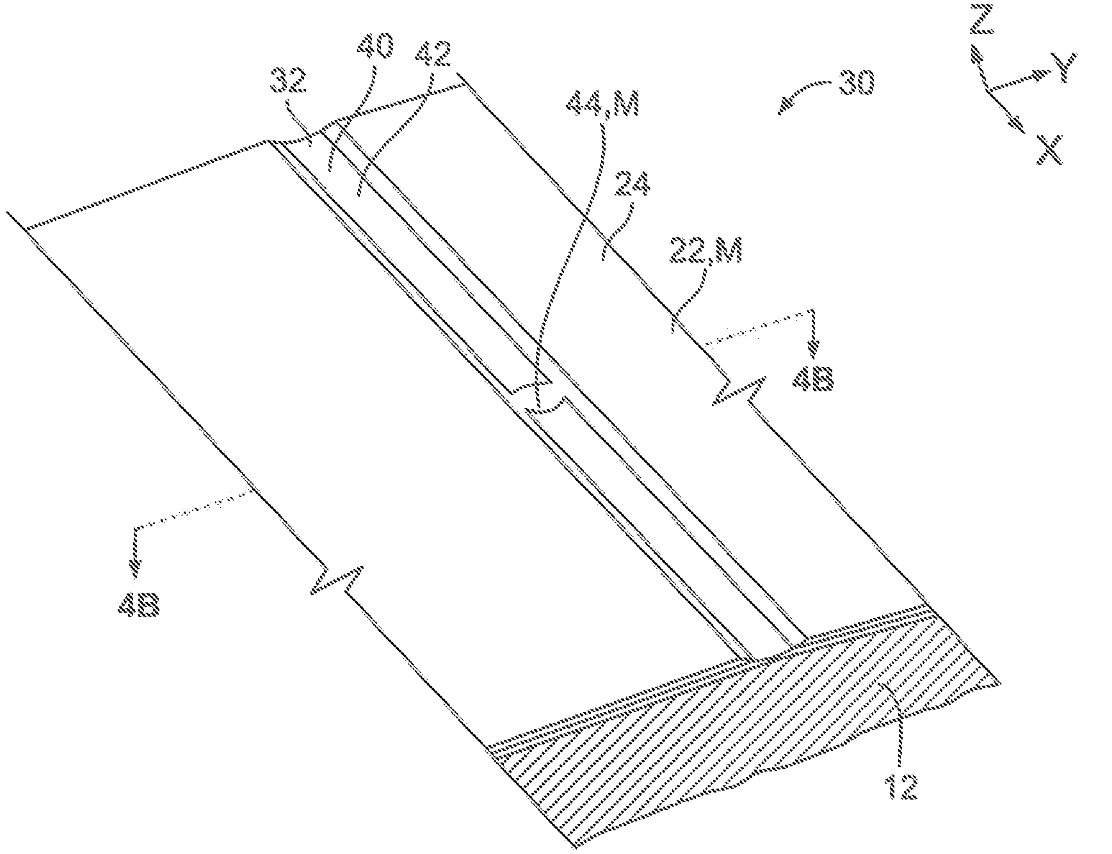
FIG. 4A illustrates a top view of the electrically conductive contact element according to the second embodiment of the present invention at a later stage than the initial stage.
Figure 4B:
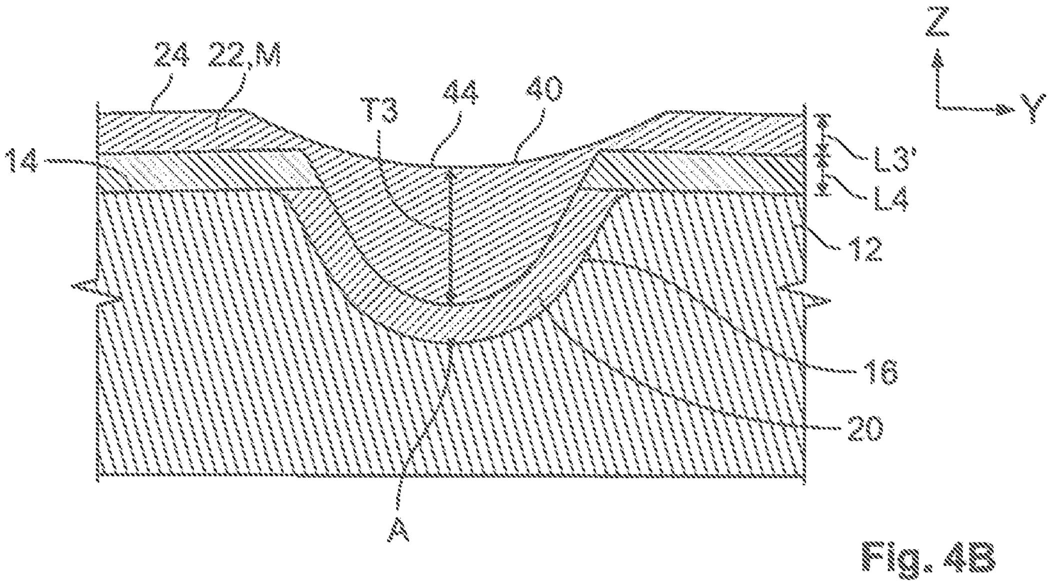
FIG. 4B illustrates a cross-sectional view of the electrically conductive contact element shown in FIG. 4A.

FIG. 4A illustrates a top view of the electrically conductive contact element 30 according to the second embodiment of the present invention at a later stage than the initial stage, wherein mechanical and/or chemical wear has occurred. FIG. 4B illustrates a cross-sectional view of the electrically conductive contact element 30 shown in FIG. 4A. FIG. 4A and FIG. 4B are described together in the following.

In the following, elements with the same reference numeral already described and illustrated with respect to FIGS. 1 to 3 will not necessarily be described in detail again, but reference is made to the previous description of the same reference numeral. In the stage of wear shown in FIGS. 4A, 4B, the mechanical and/chemical wear has caused a disruption 40 in the contact surface 24 leading to the exposure of the adhesion layer 32. At a later stage (not represented), the further removal of the adhesion layer 32 could lead to the exposure of the face 14 of the body 12. In the example of FIG. 4A, the disruption 40 has the shape of a groove 42 extending along the axis X. Such linear groove shape may be caused by a back-and-forth motion of the mating contact surfaces for example. Other shapes (not represented) of disruption 40 in the contact surface 24 may occur, depending on the relative motions of the connector and the mating connector for instance. According to the present invention, the presence of the depression 16 in the body 12 allows providing a reservoir 20 of electrically conductive material M such that at the wear stage of FIGS. 4A and 4B, a contact area 44 of electrically conductive material M still remains at the contact surface 24 despite the disruption 40.

As shown in FIG. 4B, in the wear stage represented in FIGS. 4A and 4B, a thickness T3, wherein T3<T2, of electrically conductive material M above the deepest point A of the depression 16 still remains in the reservoir 20. Hence, an uneven wear at the contact surface 24 is achieved allowing providing at least one contact area 44 of low electrical contact resistance. It is noted that the same effect of providing a contact area 44 of electrically conductive material M would occur in the electrically conductive contact element 10 according to the first embodiment. In contrast with the second embodiment, a disruption 40 in the contact surface 24 in the contact element 10 according to the first embodiment would lead to expose directly the face 14 of the body 12, due to the absence of an adhesion layer.

Figure 5:
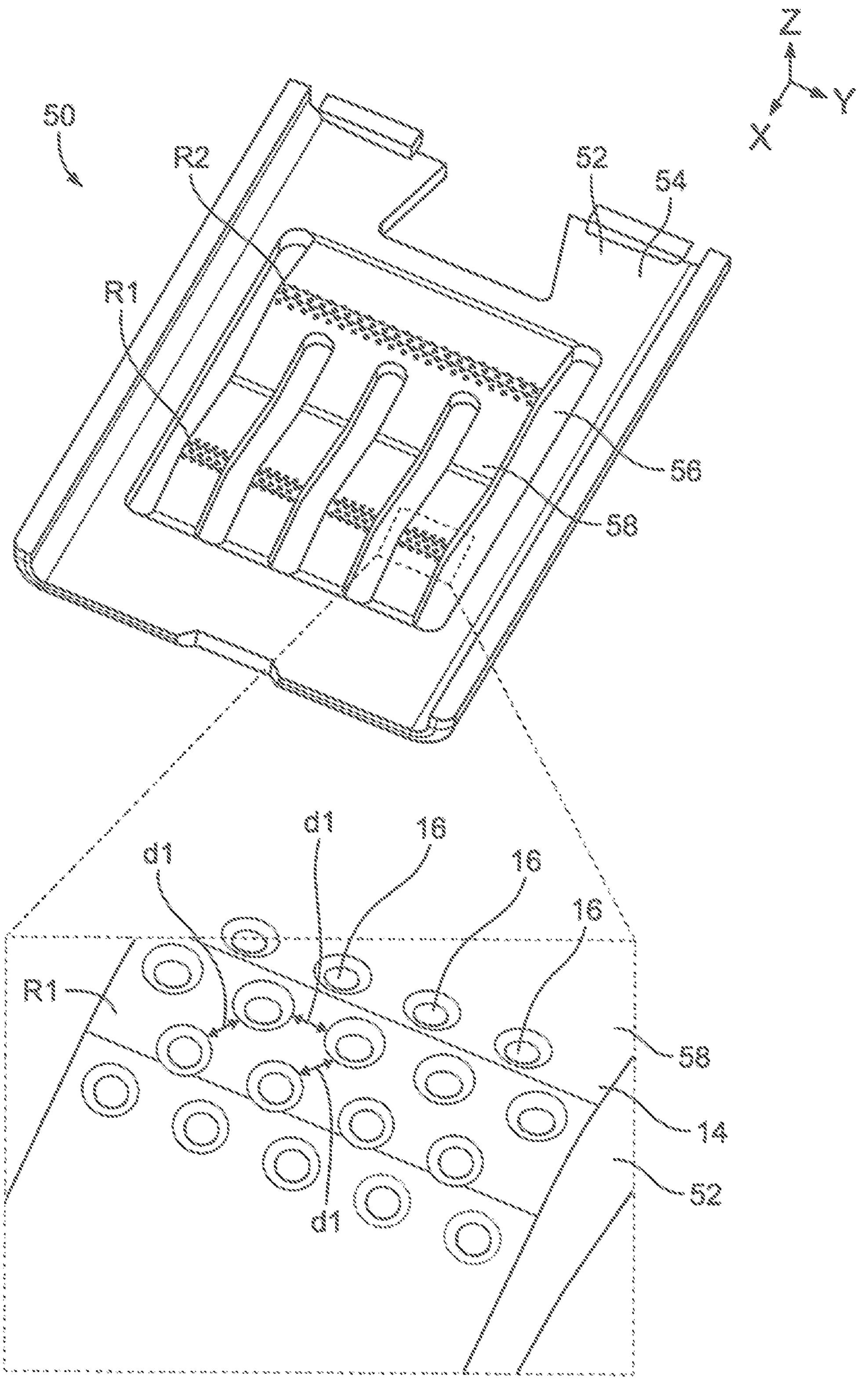
FIG. 5 illustrates an enlarged view of a body of an electrically conductive contact element according to a third embodiment of the present invention.

FIG. 5 illustrates an enlarged view of an electrically conductive contact element 50 according to a third embodiment of the present invention. In order to show the depressions 16 formed in the electrically conductive contact element 50, the electrically conductive material M and the optional adhesive layer 52 is not represented in FIG. 5. The electrically conductive contact element 50 according to a third embodiment has a metallic body 52 comprising a frame 54 extending in a plane (XY) and defining an aperture 56. Four contact pins 58 extends within the frame 54 across the aperture 56. The number of contact pins 58 is not limitative. Each contact pins 58 are bent with respect to the plan (XY) such as to be provided with two slightly curved regions R1 and R2. The number of curved regions is not limitative.

The curved regions R1, R2 consist of the regions of the electrically conductive contact element 50 onto which greater elastic spring forces are exerted in comparison with the rest of the contact pins 58. Elastic spring forces is intended to be exerted on the curved regions R1, R2 by a connecting part of a mating connector applying a pressure on the curved regions R1, R2 in a mating state of the connectors. The curved regions R1, R2 are provided with a plurality of depressions 16 formed in the face 14 of the metallic body 52, as previously described in reference to FIGS. 1 and 2. The depressions 16 of the plurality of depressions 16 are spaced away from each other by a minimal distance d1, wherein d1 is comprised between 0.10 mm and 0.15 mm. In particular, d1=0.125 mm. The location of the plurality of depressions 16 at the curved regions R1, R2 allows improving the wear resistance at the area most subject to mechanical stress, and therefore to wear. The plurality of depressions 16 provide a redundancy of improved contact areas, thereby enhancing the reliability and durability of the electrical contact between the electrical connectors.

Figure 6A:
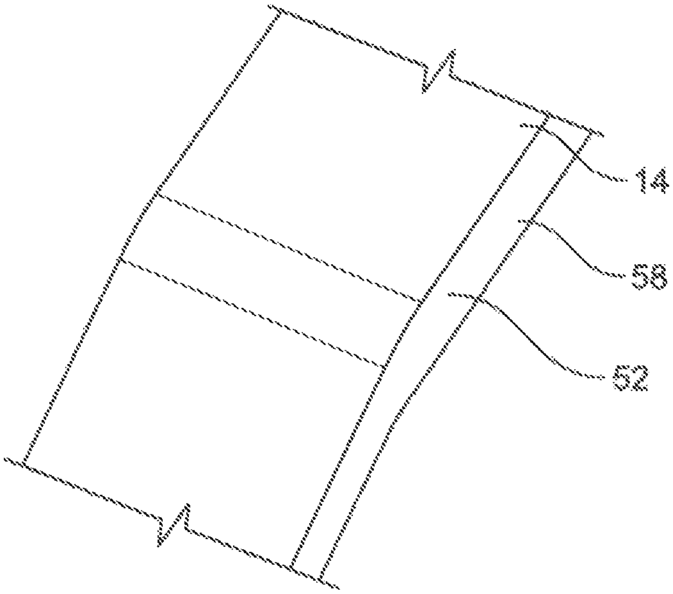
FIGS. 6A, 6B and 6C illustrate successive steps of a method of manufacturing a contact surface of the electrically conductive contact element according to the third embodiment of the present invention.
Figure 6B:
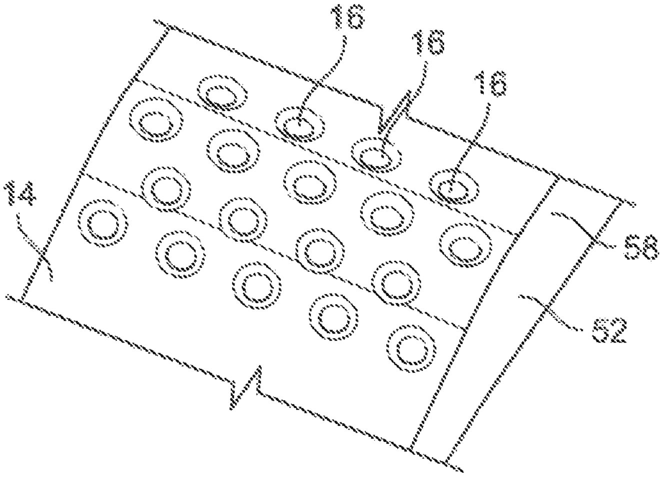
Figure 6C:
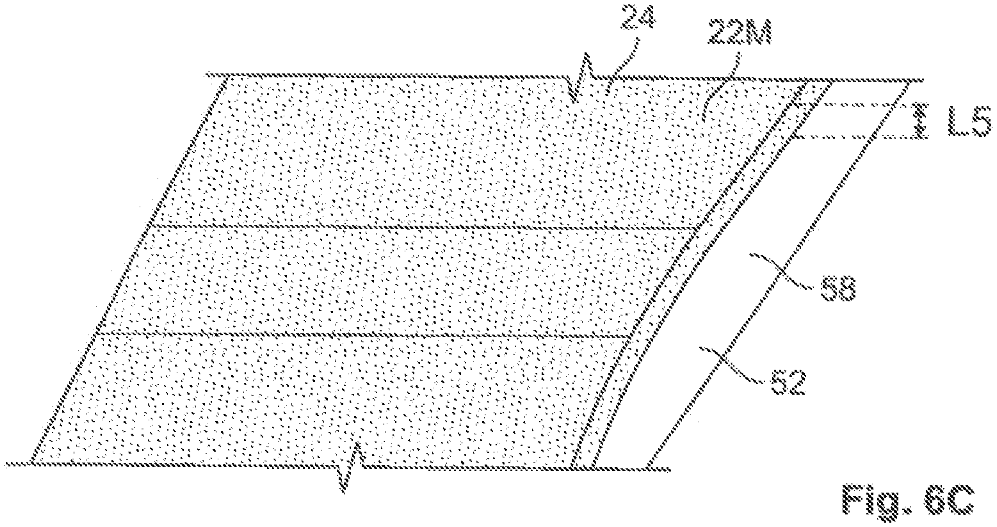

FIGS. 6A, 6B and 6C illustrate successive steps of a method of manufacturing a contact surface of the electrically conductive contact element 50 according to the third embodiment of the present invention. At the step represented by FIG. 6A, the face 14 of the metallic body 12 at the contact pin 58 is substantially uniform. At the step represented by FIG. 6B, a plurality of depressions 16 has been formed by metal punching in the face 14 of the metallic body 12 at the contact pin 58. In the example of FIG. 6A, each depression 16 has a substantially half-spherical shape. In a variant (not represented), the depressions 16 can have a different shape than a substantially half-spherical shape. In another variant (not represented), the plurality of depressions 16 can comprise a combination of depressions 16 of different shapes and/or sizes. At the last step of the manufacturing method represented by FIG. 6C, a plating layer 22 of the electrically conductive material M of thickness L5 has been provided on the face 14 of the metallic body 12 thereby coating the face 14 and filling each depression 16 with the electrically conductive material M. The surface 24 of the plating layer 22 facing away from the body 52 forms the contact surface 24 of the electrically conductive contact element 50.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An electrically conductive contact element for an electrical connector, comprising:

a body including a first face having at least one depression forming a reservoir defined therein; and a layer of electrically conductive material provided on the first face of the body and filling the at least one depression, the layer defining a contact surface adapted to be brought into contact with a surface of a connecting part of a mating electrical connector mated with the electrical connector, the contact surface is entirely formed by a surface of the layer of electrically conductive material facing away from the body.

2. The electrically conductive contact element according to claim 1, wherein the electrically conductive material filled in the reservoir is sized and positioned to come in contact with a surface of the connecting part of the mating electrical connector.

3. The electrically conductive contact element according to claim 1, wherein the body is made of metal and the electrically conductive material is a plating material made of tin, nickel, silver, gold, a tin-nickel alloy, an alloy of tin or a nickel-silver alloy.

4. The electrically conductive contact element according to claim 1 wherein a minimum dimension of the at least one depression in a plane of the first face of the body is greater than 0.05 mm, in particular is comprised between 0.05 mm and 0.06 mm.

5. The electrically conductive contact element according to claim 4, wherein a maximal depth of the at least one depression is greater than 0.05 mm.

6. The electrically conductive contact element according to claim 1, wherein the at least one depression has a half-spherical shape or a groove shape.

7. The electrically conductive contact element according to claim 6, wherein the at least one depression has a rounded groove shape.

8. The electrically conductive contact element according to claim 1, further comprising an adhesion layer provided on the first face of the body and sandwiched between the first face of the body and the layer of the electrically conductive material.

9. The electrically conductive contact element according to claim 8, wherein in the at least one depression, a thickness of the electrically conductive material is greater than a thickness of the adhesion layer.

10. The electrically conductive contact element according to claim 8, wherein the adhesion layer is made of nickel, copper or tin.

11. The electrically conductive contact element according to claim 1, further comprising a plurality of depressions, wherein a minimum spacing distance between the depressions is between 0.10 mm and 0.15 mm.

12. The electrically conductive contact element according to claim 1, wherein the first face of the body defines at least one curved region curved in at least one direction, the at least one depression arranged on the at least one curved region.

13. The electrically conductive contact element according to claim 1, wherein the first face of the body includes a plurality of depressions of different shapes and/or sizes.

14. An electrical connector adapted to be coupled with a mating electrical connector, comprising:

an electrically conductive contact element comprising:

a body including a first face having at least one depression defined therein, the first face of the body defines at least one curved region curved in at least one direction, the at least one depression arranged on the at least one curved region; and a layer of electrically conductive material provided on the first face of the body and filling the at least one depression, the layer defining a contact surface in the area of the at least one depression adapted to be brought into contact with a surface of a connecting part of a mating electrical connector mated with the electrical connector.

15. The electrical connector of claim 14, further comprising an adhesion layer provided on the first face of the body and arranged directly between the first face of the body and the layer of the electrically conductive material.

16. The electrical connector of claim 15, wherein in the at least one depression, a thickness of the electrically conductive material is greater than a thickness of the adhesion layer.

17. A method of manufacturing a contact surface of an electrically conductive contact element, comprising the steps of:

forming at least one depression in a first face of a body of the electrically conductive contact element, the first face of the body defines at least one curved region curved in at least one direction, the at least one depression arranged on the at least one curved region; and applying a layer of an electrically conductive material on the first face including filling the at least one depression with the electrically conductive material.

18. The method according to claim 17, further comprising the step of, before the step applying the layer of electrically conductive material, applying an adhesion layer on the first face of the body of the electrically conductive contact element.

19. The method according to claim 17, wherein the step of forming the at least one depression includes the process of metal punching.

20. An electrically conductive contact element for an electrical connector, comprising:

a body including a first face having at least one depression forming a reservoir defined therein, the first face of the body defines at least one curved region curved in at least one direction, the at least one depression arranged on the at least one curved region; and a layer of electrically conductive material provided on the first face of the body and filling the at least one depression, the layer defining a contact surface adapted to be brought into contact with a surface of a connecting part of a mating electrical connector mated with the electrical connector, the contact surface formed by a surface of the layer of electrically conductive material facing away from the body.

* * * * *